United States Patent [19]

Haack

[11] 4,219,209
[45] Aug. 26, 1980

[54] BICYCLE WITH FRAME ARTICULATED TO UNDERGO ANGULAR MOVEMENT WHILE BEING RIDDEN

[76] Inventor: Frank P. Haack, 6 Dorfmeister Ct., Madison, Wis. 53714

[21] Appl. No.: 707,434

[22] Filed: Jul. 21, 1976

[51] Int. Cl.² .................... B62K 19/00; B62K 21/00
[52] U.S. Cl. .................................. 280/278; 280/287
[58] Field of Search ............... 280/263, 266, 267, 268, 280/278, 287, 281

[56] References Cited

U.S. PATENT DOCUMENTS

| | | | |
|---|---|---|---|
| 86,235 | 1/1869 | Laubach | 280/263 |
| 1,584,568 | 5/1926 | Clark | 280/278 |
| 2,812,194 | 11/1957 | Ajero | 280/263 |
| 3,801,130 | 4/1974 | Belden | 280/268 X |

*Primary Examiner*—John J. Love
*Assistant Examiner*—Randall A. Schrecengost
*Attorney, Agent, or Firm*—Keith Schoff

[57] ABSTRACT

A bicycle with an articulated frame is described for novelty riding use. A rider may manipulate a clutch while riding the bicycle to cause restraint to be removed from a joint joining front and rear frame portions of the bicycle and maneuver in such a way as to cause the two frame portions to be angularly aligned.

3 Claims, 2 Drawing Figures

BICYCLE WITH FRAME ARTICULATED TO UNDERGO ANGULAR MOVEMENT WHILE BEING RIDDEN

BACKGROUND OF THE INVENTION

Bicycles having steerable wheel either at the front or at the rear, or at both the front and rear when the steering forks are coupled for movement, are known, but no bicycle has been known with an articulated frame which enables the angular alignment of frame sections to be changed while the bicycle is being ridden.

SUMMARY OF THE INVENTION

A bicycle is provided with the frame articulated about a vertical axis above the drive sprocket with the frame sections forward and rearward of the axis being free to be manipulated in alignment and fixed in position by manual actuation of a clutch coupling the frame sections while the bicycle is being ridden.

DESCRIPTION OF THE INVENTION

Figure 1:
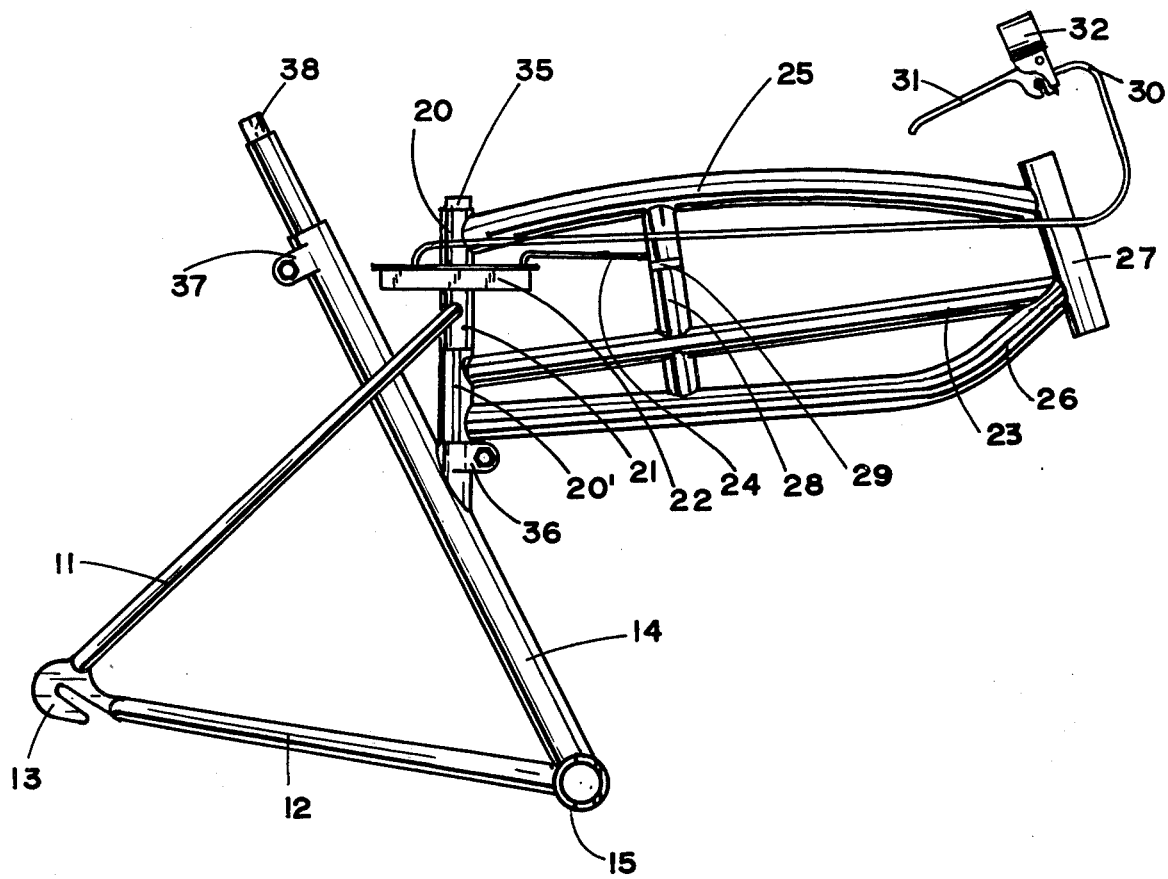
FIG. 1 is an elevation of an articulated frame for a bicycle of this invention.

Referring to FIG. 1, frame 10 comprises bifurcated upper rear frame member 11, and bifurcated lower rear frame member 12. The distant leg portions of each of frame members 11 and 12 are concealed from view in the view shown by the respective near leg portions. The two near leg portions and the two distant leg portions of rear frame members 11 and 12 are respectively interconnected by attachment to one of a pair of rear wheel axle mounts 13. The distant axle mount member 13 is concealed from view by the near member.

The upper portion of upright frame member 14 is unitarily connected to upper rear frame member 11 and the lower end extremity is unitarily connected to chain sprocket housing 15, to which the forward end extremity of lower rear frame member 12 is also connected. A rigid bifurcated triangular frame sub-assembly is provided which is conventional and comprises no part of this invention.

Spindle clamp 36 is operably mounted on upright member 14 to receive and retain spindle 35 in substantially vertical position. Journaled sleeve 21 is fixed to the forward end extremities of upper rear frame member 11 and the concealed distant leg counterpart thereof. Aligned with sleeve 21 and disposed respectively superjacent and subjacent thereto are sleeves 20 and 20' which together with sleeve 21 receive spindle 35 therethrough and form a substantially vertical joint in frame 10. The sleeves may be provided with bearing metal inserts or with anti-friction bearing means as desired. Sleeves 20 and 20' are fixed to a rigid trio of forward frame member bars 23, 25 and 26, and which at their forward extremity terminate in fixed sleeve 27 which receives the front wheel mounting fork stem in conventional manner. Lower front frame member bar 26 is disposed above the upper reach of the pedal crank arm 40 (FIG. 2) to avoid causing interference with the feet of a person riding the bicycle while he pedals, but is positioned low enough so that the lower portion of the rider's leg can push laterally against the forward frame portion to change alignment between the front and rear frame sections when desired. Use of the legs in this manner facilitates quick and easy re-alignment and control of the bicycle while it is being ridden.

Clutch drum 22 is fixedly attached to sleeve 21 and is operably equipped with internal expanding shoe means (not shown) which is anchored by arm 24 fixed by band 29 to post 28. The drum and shoe each being anchored to frame members which are articulated with respect to each other provide releasable means for fixing the angular configuration of the bicylce frame in any desired position. The expanding shoe member is operably engaged with clutch drum 22 by manually actuating lever 31 to tension sheathed cable operator 30 and bias the shoe against the internal surface of the drum. The operative drum and shoe mechanism is similar to the drum brake of a bicycle wheel hub and is easily adapted therefrom.

Figure 2:
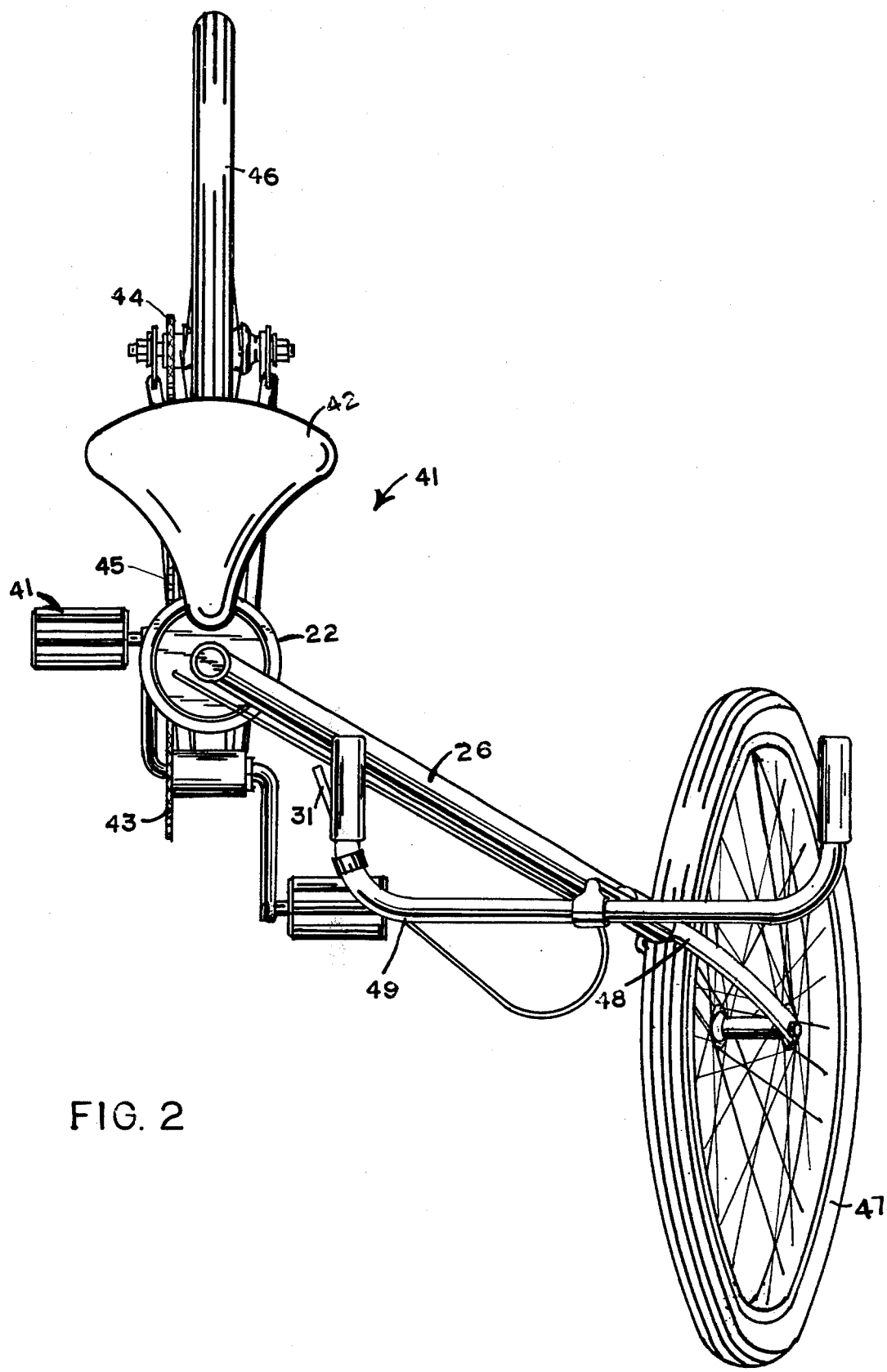
FIG. 2 is a plan view of a bicycle of this invention incorporating the articulated frame of FIG. 1.

In FIG. 2 articulated bicycle 41 is shown incorporating the bicycle frame of FIG. 1 and equipped with crank 40, pedals 41, seat 42, front and rear chain spockets 43 and 44, respectively, chain 45, rear wheel 46, and front wheel, mounting fork and handlebars 47, 48, and 49, respectively. Frame 10 is shown angularly aligned with the front and rear wheels in parallel alignment. The bicycle can be operably ridden in this position. In practice, a bicycle rider would commence riding the bicycle in linearly aligned position and would release lever 31 after the bicycle is in motion to enable him to alter the frame alignment by pressing to the left or right with his legs against frame bars 23, 25, and 26. When the desired angle of articulation about spindle 35 is achieved, lever 31 is manipulated to tighten cable operator 30 and engage the clutch means comprising drum 22. The bicycle can be operably ridden in this position or can be altered from this position while being ridden as often or as quickly as desired providing sport for the rider and amusement for spectators.

It is preferred that spindle 35 be substantially vertically set, however, it is possible for the axis of articulation to have a caster angle. Mounting sleeve 27 for the front wheel mounting fork preferably is provided with a caster angle usual for bicycles, although a vertical axis may be operably provided, but when an angle of caster is provided for sleeve 27, an angle of camber is also introduced when the frame 10 is angularly aligned resulting in the front wheel and rear wheel planes being askew, and furthering the appearance of impossible achievement in riding the bicycle, particularly when angular positions of frame 10 are switched rapidly while steering maneuvers are simultaneously performed, all adding to the entertainment provided by the bicycle.

I claim:

1. A bicycle with an articulated frame which enables a rider to engage in trick and novelty riding using his legs to assist in angularly aligning the bicycle frame while riding the bicycle comprising
   (a) a steerable front wheel and fork assembly wherein said fork is configured with a journaled stem and has affixed thereto a handlebar,
   (b) a rear wheel,
   (c) a unitary rear frame member comprising a rear wheel mounting leg portion extended rearmost, a sprocket housing disposed foremost, a frame joint portion disposed to provide a relatively vertical axis of frame articulation substantially intermediate said sprocket housing and the rearmost extension of said mounting leg portion, and a fixed mounting, for a bicycle seat located on said rear frame just slightly rearward of said vertical axis joint portion, (d) a unitary front frame member comprising a means disposed foremost of the front frame for receiving said journaled front fork stem, a rearmost disposed front frame joint portion operatively coupled to said frame joint portion of said rear frame member, the front frame member thereby extending between the legs of the rider and thus enabling the front member to be angularly positioned with respect to the rear frame member about said vertical joint portion by the lateral movement of the rider's legs when the bicycle is being ridden.

2. The bicycle of claim 1 comprising:

(a) a first clutch member fixed to said front frame member, (b) a second clutch member fixed to said rear frame member, (c) means for engaging said clutch members and disengaging said members, wherein said first clutch member and said second clutch member are each disposed to rotate with respect one to the other about said axis.

3. The bicycle of claim 2 wherein said means for engaging said clutch members and for disengaging said members is disposed mounted for manual actuation on said front frame portion.

* * * * *